United States Patent [19]

Zagorski

[11] Patent Number: 4,966,555
[45] Date of Patent: Oct. 30, 1990

[54] ELECTROSTATIC ASSIST ROTOGRAVURE PRINTING SAFETY CONTACT

[75] Inventor: Gary A. Zagorski, Downers Grove, Ill.

[73] Assignee: Rotation Dynamics Corporation, Hinsdale, Ill.

[21] Appl. No.: 342,478

[22] Filed: Apr. 24, 1989

[51] Int. Cl.$^5$ .......................................... H01R 39/08
[52] U.S. Cl. ..................................... 439/28; 101/153; 101/206
[58] Field of Search ..................... 439/18, 20, 23–25, 439/28, 13, 206; 101/153, 216

[56] References Cited

U.S. PATENT DOCUMENTS

| | | | |
|---|---|---|---|
| 2,742,582 | 4/1956 | Bahn et al. | 439/206 |
| 2,776,385 | 1/1957 | Modrey | 439/206 |
| 2,854,647 | 9/1958 | Nugent | 439/25 |
| 3,022,479 | 2/1962 | Rohrbach | 439/13 |
| 3,234,495 | 2/1966 | Martinez | 439/25 |
| 4,329,004 | 5/1982 | Lewis | 439/24 |
| 4,664,538 | 5/1987 | Galbato | 384/477 |
| 4,697,514 | 10/1987 | George et al. | 101/153 |

OTHER PUBLICATIONS

IBM Bulletin, "Pressurized Electrical Contact Block Assembly", vol. 9, No. 9, Feb. 1967, p. 1088.

*Primary Examiner*—Gary F. Paumen
*Attorney, Agent, or Firm*—Juettner Pyle Lloyd & Verbeck

[57] ABSTRACT

A rotary safety contact featuring dual brush contacts, contained within an isolating housing, shielded from the environment, purged with compressed air to prevent the entry of potentially explosive vapors, and adapted to be connected to a conductive cylinder/roller for electrostatic assist rotogravure printing is disclosed and described.

35 Claims, 3 Drawing Sheets

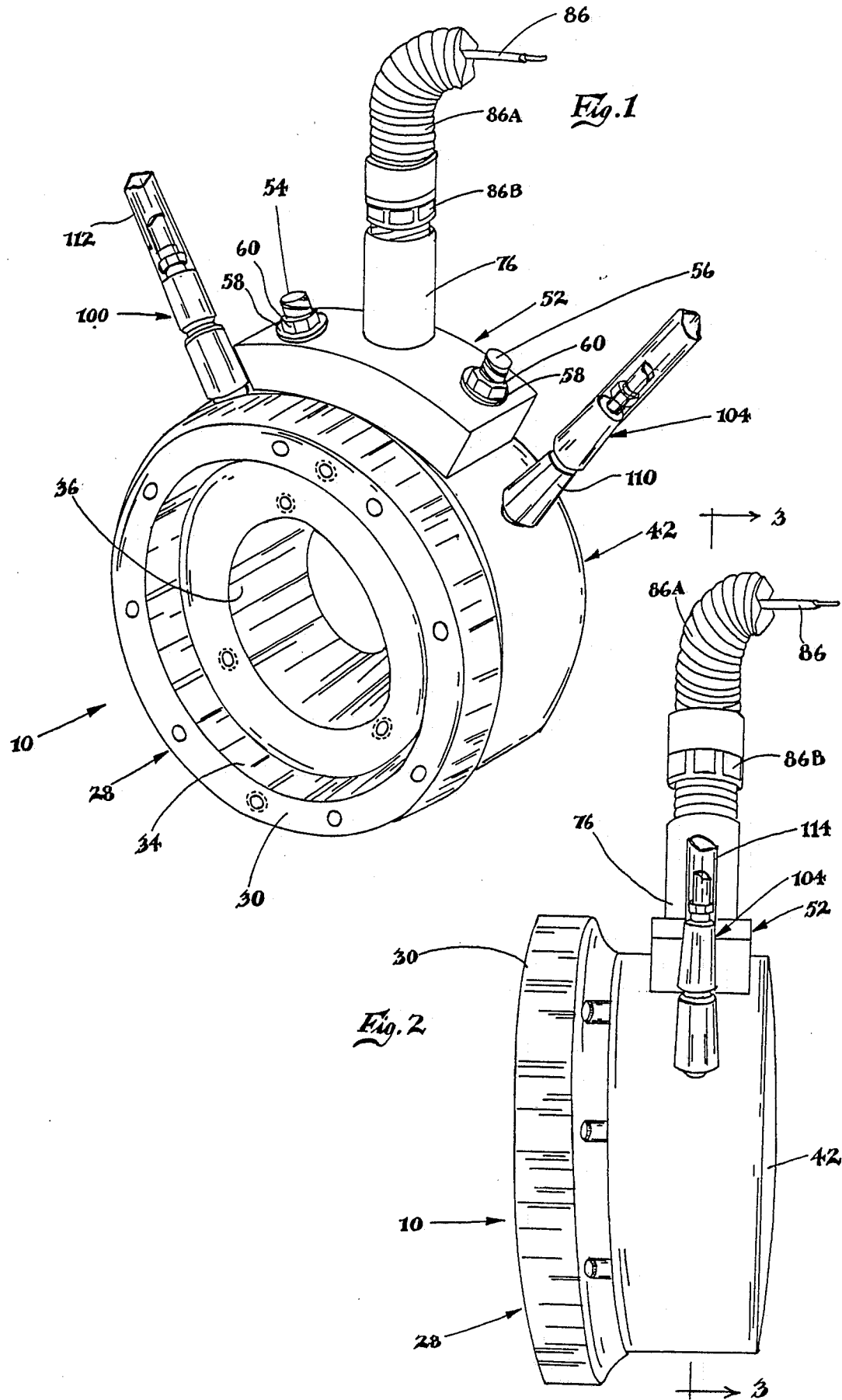

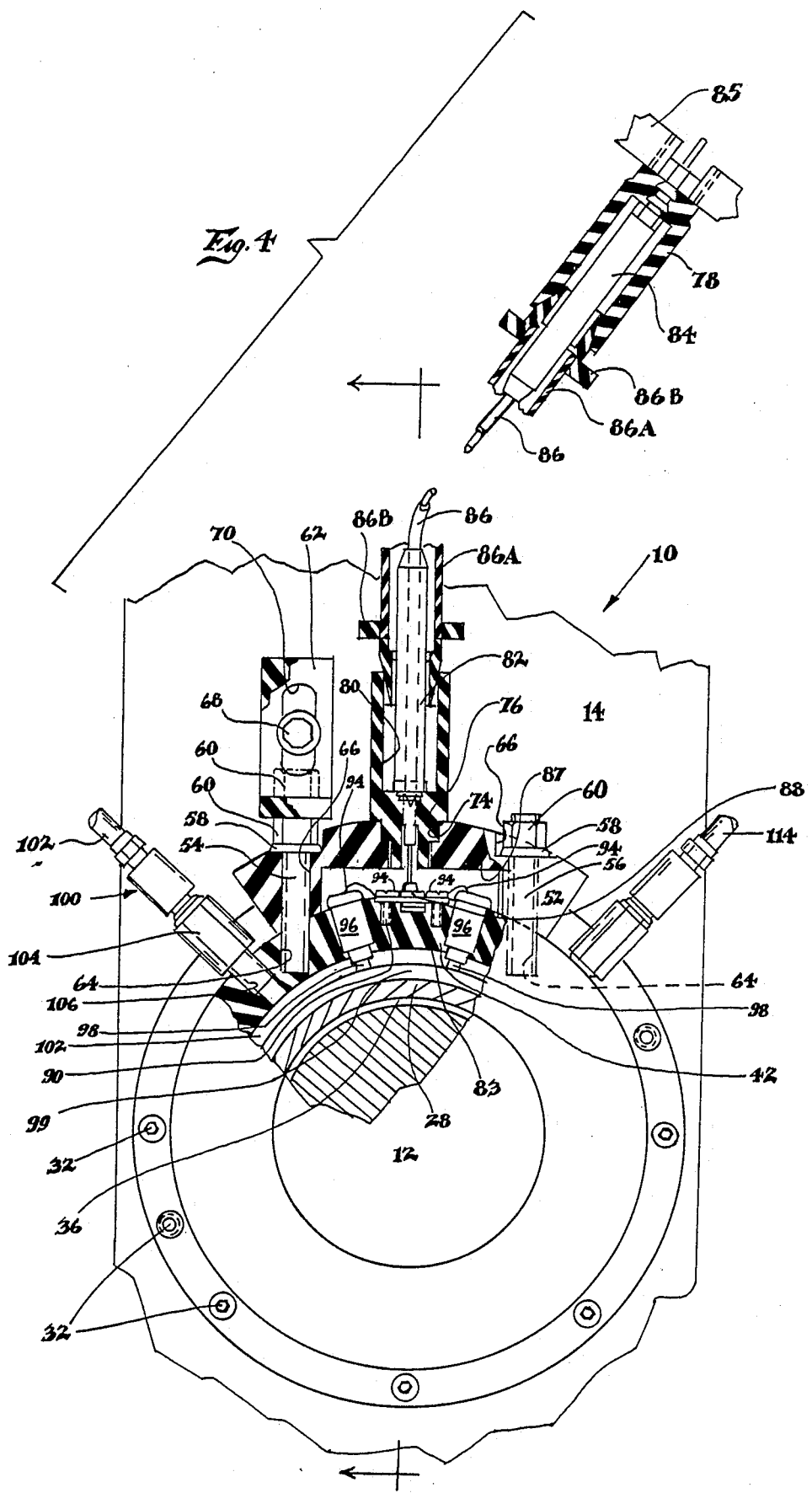

ELECTROSTATIC ASSIST ROTOGRAVURE PRINTING SAFETY CONTACT

DISCLOSURE

This invention relates to electrostatic assist ("ESA") rotogravure printing, and more particularly to a safety contact for charging a conductive roller used in such printing.

BACKGROUND OF THE INVENTION

Electrostatic assist printing has been used for sometime, particularly in the rotogravure field. As is well known, many of the inks used in gravure printing including electrostatic assist rotogravure printing, contain solvents which are very volatile, flammable, and capable of forming an explosive mixture with air which could be set off by a spark or fire. In electrostatic assist printing, a high voltage (say 500 volts or more) charge is transmitted from a generating power pack to a conductive material on, for example, an impression cylinder or roller. This charge on the impression roller helps draw the ink from the cells on the gravure cylinder onto the web or sheet which runs between the gravure cylinder and impression cylinders.

Various means, such as a simple contact made of copper sheet, paddle contact, single brush (see U.S. Pat. No. 4,697,514), or corona bar have been used to charge the conductive surface of the impression cylinder. As it is possible to have a spark occur with such contact mechanisms, heretofore attempts have been made to eliminate or minimize the problem by designing the power pack with safety circuitry so that as soon as a current surge is detected, as would occur were a spark eminent, the power pack is shut down to prevent the occurance of a spark. While such systems have worked well, they are not foolproof, and were the safety circuit to malfunction, a disastrous spark might occur.

BRIEF SUMMARY OF THE INVENTION

The present invention provides a safety contact for transmitting the high voltage to the conductive impression cylinder or other roller which will prevent a disaster even if the power pack safety circuit fails and/or even if a spark occurs. The safety contact of the present invention comprises a rotatable conductive member adapted to be mounted to a cylinder or roller of a printing press, such as an impression cylinder or roller and is adapted to be in communication with a conductive outer surface of the cylinder/roller, a stationary member mounted adjacent the rotatable conductive member, the stationary member being adapted to be secured to a stationary portion of the printing press, brush means, preferably, mounted on the stationary member and engaging the rotatable conductive member, and means between said two members for isolating said brush means from the environment. Preferably, the latter means comprises a pair of sealed bearings which engage the two members and accurately axially and radially locate the brush means with respect to the rotating member to reduce the potential of sparking. The bearings also assuring long brush life and complete the enclosure of the brushes to also keep the potentially explosive ink or other solvent vapors in the press environment from the brush means. Preferably, the brush means has two or more brushes. The presence of two or more brushes ensures one or more brushes is likely to be in contact so that even if one of the brushes loses contact, no spark occurs. Preferably, to further reduce the possibility of disaster, the isolated, enclosed space in which the brushes are contained, is provided with purging means to keep the potentially dangerous vapors away from the brushes. This solvent-free purging means can take the form of a compressed air inlet and outlet to pressurize the brushes so that potentially explosive vapors cannot infiltrate to the brushes even if the bearings or their seals fail.

To facilitate maintenance, a portion of the stationary member enclosing the brushes is made removable so that the brushes may be inspected and/or easily serviced. In addition, the connection of the brushes to the power pack utilizes quick disconnects to make it possible to easily service the safety contact, the power pack or the cylinder/roller connected to the safety contact.

It is a primary object of the safety contact of the present invention to provide a failsafe way to charge a conductive cylinder/roller used in electrostatic assist printing.

Another object of the safety contact of the present invention is to provide at least two brushes so that at least one is likely to be in contact and, thereby, avert sparking.

Yet another object of the safety contact of the present invention is to accurately radially and axially locate an electrical contact brush so that sparking is less likely to occur.

A further object of the safety contact of the present invention is to isolate the brush from potentially hazardous vapors found in an electrostatic printing environment.

Still a further object is to provide a safety contact which is pressurized to prevent the entry of potentially hazardous vapors into the contact assembly.

Yet still another object of the safety contact of the present invention is to provide ease of installation and service of the contact, power pack and cylinder/roller.

BRIEF DESCRIPTION OF THE DRAWINGS

FIG. 1 is a perspective view of the safety contact of the present invention.

FIG. 2 is a side elevational view of the safety contact shown in FIG. 1.

FIG. 4 is a cross-sectional view taken along the line 4—4 of FIG. 3.

BRIEF DESCRIPTION OF THE PREFERRED EMBODIMENT

Figure 3:
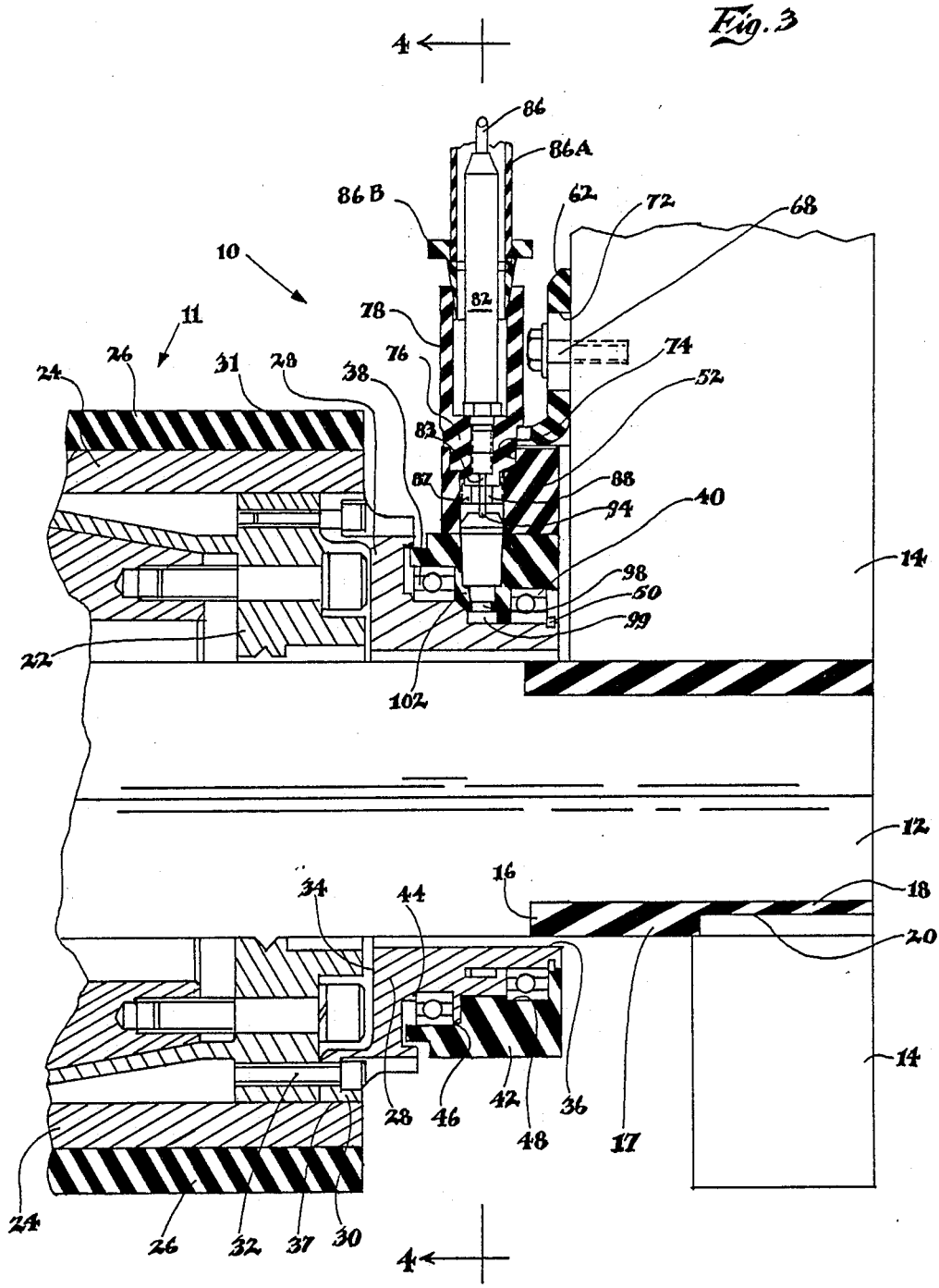
FIG. 3 is a partial cross-sectional view taken along the lines 3—3 of FIG. 2 shown installed on a roller.

Referring to the drawings, a safety contact 10 of the present invention is illustrated. In this instance, the safety contact 10 has been adapted to fit on the impression cylinder or roller (see FIGS. 3 and 4) of a Cerutti press and adapt that roller to use electrostatic assist (ESA) printing. Of course, the present invention could be adapted to any press, either one originally built for ESA or without ESA.

The impression cylinder or roller 11 in the Cerutti press has a stationary central shaft 12 which is held by hangers 14 at each end (one being partially shown) from the press frame (not shown) as is conventional. In this instance, to electrically isolate the stationary shaft 12 from the hanger, the end of the shaft is turned down, as indicated at 16, and a sleeve 17 made of a insulating phenolic material well known in the press field, is secured, as by press fit and/or adhesive, to the turned down shaft. As the shaft 12 originally had a locating flat on its bottom side which cooperated with a similar flat on the bottom of the opening 18 on the hanger, a duplicate flat 20 is provided on the sleeve 17. The axial length of the sleeve is such that it, at one press end, will run underneath an end of the safety contact 10, and at the other press end is of a length to ensure no arcing or sparking from the shaft 12 to the opposite hanger.

The shaft 12 carries a rotatably mounted end cap or inner portion 22 which is made of steel and rotatably mounted on the shaft 12 by inwardly mounted bearings (not shown). The inner portion 22 carries a replaceable outer steel roller core 24 to which is applied a replaceable conductive or semi-conductive material 26, such as a conductive rubber. Periodically, the roller 11 must be removed from the press to recover the core with a new rubber as the rubber coverings, and even to some extent the cores wear or deteriorate in quality with use. Thus, it is desirable to make sure the roller 11 and its core 24 carrying the conductive rubber 26 can be quickly and easily removed.

As is better shown in FIGS. 1 and 2, the safety contact 10 comprises a generally inner rotating ring member 28 which is generally annular in shape and has at one end a mounting flange 30 secured by bolts 32 (FIG. 4) to the inner portion 22 of the roller. The inner ring member 28 is mounted concentrically and rotates with the inner portion 22 of the roller. As is shown, the interior of the flange 28 is hollowed, as indicated at 34, to clear the axially extending structure of the roller 11. The outer, circumferential surface 31 of the flange 30 is in physical contact with the inner, circumferential surface of the core 24 to provide electrical contact between the two parts. The annular opening 36 of the inner member 28 is, of course, clearanced to accommodate the passage of the stationary shaft 12. The outer surface of the inner member 28 is stepped and carries two bearings, preferably self lubricated ball bearings 38 and 40. Each of the ball bearings carry seals on their inner and outer ends to contain the bearings' lubrication and for reasons which will become apparent later.

An outer, and in this instance, stationary ring member 42 is mounted on the bearings 38 and 40. This outer member 42 has a stepped inner surface to accommodate the outer races of the bearings. In more particular, the larger diameter bearing 38 is located between the left outer shoulder 44 on the inner member 28 and the right inner shoulder 46 on the outer member 42. The smaller diameter bearing 40 is located by the left inner shoulder 48 on the outer ring 42 and the snap ring 50 located in a groove on the right outer end of the inner member 28, as shown in FIG. 3. Thus, the inner member 28 can rotate with portions of the roller 11, while the outer member 42 can be held stationary. The two members 28 and 42 provide two adjacent surfaces, one on each member, which are relatively rotatable to one another. Of course, other constructions could be utilized to construct the safety contact of the present invention, such as with the inner member stationary and the outer member rotating, or with the inner and outer members formed by axially adjacent annular discs suitable relatively rotatably mounted on bearings located between the inner and outer members' adjacent surfaces.

Unlike the member 28, the member 42 is made of an insulating material such as a phenolic, and with the construction described the safety contact 10 has the member made of insulating material shielding the other member.

As is shown (FIG. 1), the stationary member 42 carries a removable housing or cap 52 which is mounted to the member 42 by a pair of studs 54 and 56 (FIG. 3), extending from the member 42, and secured in place by a pair of washers 58 and nuts 60. While not shown, if desired, a sealing gasket of a suitable nonconductive gasket material can be provided between the cap 52 and member 42. The stud 54 is longer to accommodate an "L" shaped torque strap 62 (FIGS. 3 and 4), which fits under another washer and nut. Like the outer member 42, the cap 52 and torque strap 62 are made of phenolic or other insulating material. The stud washers and nuts are also of an insulating material such as nylon, the studs on their inner ends being threaded into openings 64 formed in the stationary member 42 and passing through the openings 66 in the housing on cap 52. The torque strap 62, in turn, is loosely secured by another bolt 68 to the inside of the shaft hanger 14, adjacent the contact 10 to hold the member 42 stationary. To accommodate installation, the hanger side opening 70 for the bolt 68 is slotted. Additionally, to further electrically insulate the press hangers 14, the sides adjacent the roller are coated with a several mil thickness of insulation, such as 3M Scotchcast.

As is shown, to accommodate making an electrical connection to the safety contact 10, the cap 52 has a large central opening 74 (FIGS. 3 and 4) which threadably receives the inner end 76 of a protective nylon sleeve 78. The center 80 of the sleeve is hollow and receives a quick disconnect single pin 82 booted connector that connects the power pack 85 (partially shown) via a similar quick disconnect connector 84 housed in a similar protective sleeve. The two quick disconnect connectors 82 and 84 are connected together by a coaxial cable 86 having an outer shield and inner conductor, such a cable being manufactured by Belden, Cooper Industries. The cable 86 is protected by a protective nonconductive hose or covering 86A which is held to the sleeve by nonconductive fittings 86B.

The pin 83 of connector 82 extends into a hollow 87 (FIGS. 3 and 4) formed beneath the cap 52 into a female bayonet connector 88 secured to a small bus bar 90. The bus bar 90, in turn, is secured by two small screws 92 to the stationary member 42. The screws also secure two lead wires 94 of two brush assemblies 96 in place. The brush assemblies have two carbon brushes 98 extending therefrom on the surface of the stationary member 42 that is adjacent the rotating member 28. Cooperating with the brushes is a slip ring 99 (FIGS. 3 and 4), say made of copper, that is secured to the rotating member 28 on its surface adjacent the stationary member. The slip ring can be held in place by various means, such as soldering, press fit or mechanically fastened.

Thus, the high voltage charge can flow from the power pack 85, through the quick disconnect 84 and cable 86, to the quick disconnect 82 and its pin 83 which engages the female bayonet joint 88, to the bus bar 90 and screws 92 and wires 94 to the two brush assemblies 96 and then two carbon brushes 98. From there the charge flows, via one or both brushes to the slip ring 99, which is in electrical communication with the inner ring member 28 and to the roller core 24 and its conductive rubber outer surface 26 to carry out its ESA function.

A good electrical connection is assured as one or both of the brushes is more likely to be in contact so that the possibility of a arching at a brush is reduced, particularly compared to a single brush device. Further, as the brushes are accurately located in the bearing mounted stationary member 42, sparking due to any misalignment problems are minimized or eliminated. The use of bearings between the two members caused the carbon brushes to track true on the slip ring. Further, the brushes are isolated from the press environment which could contain potentially flammable or explosive vapors by the two members 28 and 42 and the bearings 38 and 40, each bearing, itself, being double sealed. As the bearings are self lubricated and contained between the respective seals and virtually under no load, they should require no attention and have nearly infinite life. As the brushes run true without misalignment, they should have an extremely long service life. Should the brushes, power pack or roller need service, each of the components can be easily and quickly removed due to the above described features and construction.

To further ensure the safety of the contact 10 of the present invention, an air purge system is provided for keeping potentially dangerous vapors away from the brushes. The air purge comprises a compressed air inlet 100 (FIG. 4) in communication with the seal space 102 between the inner and outer members 28 and 42. As is shown, the inlet comprises a quick disconnect inlet fitting 104 threaded into an opening 106 in the stationary member 28 which is in communication with the space 102. The outlet comprises a similar structure having a threaded opening at the top receiving a threaded quick disconnect fitting 110 and at the bottom in communication with the space 102. The inlet 100 can be connected via a hose 112 to a pressure regulator and a compressed air supply provided preferably with solvent free or "clean" air; while the outlet may be filled with a similar hose 114 leading to a valve (not shown), if desired, to regulate the air flow. If desired, the regulator or valve could be eliminated and other means, such as a restruction used to reduce the plant air pressure to a desired few psi pressure. Thus, even if sparking occurred and the sealing failed, the air purge would keep hazardous vapors and contaminants away from the brushes.

As used in this application, the term "conductive" roller covering also includes a "semi-conductive". When design constraints limit bearing space, a single bearing can be used, instead of dual bearings 38 and 40. Also, instead of a seal being provided by one of bearings 38 or 40, an O-ring or labyrinth seal can be provided, such as by using a snap ring adjacent a portion of the contact.

While the preferred embodiments of the safety contact of the present invention has been illustrated and described, from the foregoing it should be understood that the same can be adapted to any press, such as those with a rotating, instead of stationary, shaft. It should be further understood that variations, modifications and equivalent structures thereof fall within the scope of the appended claims.

What is claimed is:

1. An electrostatic assist rotogravure printing safety contact for conducting a high voltage charge from a power pack to a conductive roller rotating in a rotogravure printing press which can have explosive vapors and contaminants about it, comprising a rotating member being adapted to be physically and electrically connected to and rotate with the conductive roller, a stationary member being adapted to be connected to a stationary portion of the rotogravure printing press, said stationary member and rotating member having adjacent surfaces, brush means including at least two brushes for transferring the same electrical charge between said members, each of said two brushes being mounted on the adjacent surface of one of the members and riding against the adjacent surface of the other of said members, said two brushes being isolated from the explosive vapors, each of said brushes being adapted to be in electrical communication with the power pack, the other of said brushes, and the conductive roller, whereby at least one of said two brushes of said brush means is more likely in electrical contact with the other of said members so that the likelihood of a spark occurring is reduced.

2. An electrostatic assist rotogravure printing safety contact as in claim 1, wherein both of said brushes are mounted on the same member.

3. An electrostatic assist, rotogravure printing safety contact as in claim 2, wherein said brush means are mounted on the stationary member and ride against the rotating member.

4. An electrostatic assist rotogravure printing safety contact as in claim 1, wherein said brush means are axially aligned.

5. An electrostatic assist rotogravure printing safety contact as in claim 1, wherein said brush means are radially spaced apart.

6. An electrostatic assist rotogravure printing safety contact as in claim 1, further comprising seal means cooperating with said rotating and stationary members to isolate said brush means from the rotogravure press environment, whereby said brush means are not exposed to the explosive vapors and contaminants in the environment.

7. An electrostatic assist rotogravure printing safety contact as in claim 6, wherein said seal means locates said members relative to one another, whereby the likelihood of a spark occurring due to misalignment of said brush means is reduced and long service life is assured.

8. An electrostatic assist rotogravure printing safety contact as in claim 7, wherein said seal means comprises a pair of bearings.

9. An electrostatic assist rotogravure printing safety contact as in claim 8, wherein said pair of bearings are ball bearings having seals thereon.

10. An electrostatic assist rotogravure printing safety contact as in claim 1, comprising a pair of bearings, one disposed on each side of said brush means, said bearings being mounted on one of said members and relatively rotatably mounting the other of said members thereon.

11. An electrostatic assist rotogravure printing safety contact as in claim 10, wherein said bearings are axially displaced from one another, with said brush means located between said axially displaced bearings.

12. An electrostatic assist rotogravure printing safety contact as in claim 10, wherein each of said bearings has an outer end carrying a seal to keep the explosive vapors from said brush means.

13. An electrostatic assist rotogravure printing safety contact as in claim 12, wherein each of said bearings is self lubricated and also has an inner end carrying a seal to keep explosive vapors from said brush means, to insure lubrication of said bearings, and to keep the lubrication from said brush means.

14. An electrostatic assist rotogravure printing safety contact as in claim 1, wherein one of said members has a sealable, removable portion, said brush means being located adjacent said sealable, removable portion, whereby said brush means may be serviced by removing said sealable, removable portion.

15. An electrostatic assist rotogravure printing safety contact as in claim 14, wherein said sealable, removable portion is part of said stationary member, said sealable, removable portion being sealably, removably secured on the outer surface of said stationary member, said brush means being secured to said stationary member beneath said sealable, removable portion.

16. An electrostatic assist rotogravure printing safety contact as in claim 15, wherein said sealable, removable portion has an opening therein, and further comprising a quick disconnect adapted to be connected to the power pack for connecting said brush means to said power pack and a cooperating portion thereof connected to said brush means, said quick disconnect extending through said opening in said sealable, removable portion and engaging said cooperating portion, whereby the quick disconnect can be quickly removed for servicing said safety contact, power pack or roller.

17. An electrostatic assist rotogravure printing safety contact as in claim 1, further comprising pressurized purge means for purging said brush means with compressed air to keep the explosive vapors from said brush means, said pressurized purge means being located on said stationary member.

18. An electrostatic assist rotogravure printing safety contact as in claim 17, wherein said pressurized purge means further comprises a compressed air inlet on said stationary member and a compressed air outlet on said stationary member, said brush means being located between said compressed air inlet and outlet.

19. An electrostatic assist rotogravure printing safety contact as in claim 3, further comprising seal means cooperating with said rotating and stationary members to isolate said brush means from the explosive environment, and pressurized purge means for purging said brush means to keep the explosive vapors from said brush means, said pressurized purge means being located on said stationary member, said seal means locating said members relative to one another, whereby said brush means are not exposed to explosive vapors and contaminants in the environment, the likelihood of a spark occurring due to misalignment of said brush means is reduced, and long service life is assured.

20. An electrostatic assist rotogravure printing safety contact as in claim 19, wherein said seal means comprises a pair of ball bearings having seals thereon, said ball bearings being disposed on each side of said brush means, being axially displaced from one another, and being mounted on one of said members and relatively rotatably mounting the other of said members, each of said ball bearings having an outer end carrying a seal to keep explosive vapors and contaminants from said brush means, being self lubricated, and also having an inner end carrying a seal to keep explosive vapors and contaminants from said brush means, to ensure lubrication of said bearings, and to keep the lubrication from said brush means, and a sealable, removable portion on said stationary member, said brush means being located beneath said sealable, removable portion, whereby said brush means may be serviced merely by removing said sealable, removable portion.

21. An electrostatic assist rotogravure printing safety contact for conducting a high voltage charge from a power pack to a conductive roller rotating in a rotogravure printing press which can have explosive vapors and contaminants about it, comprising a rotating member being adapted to be physically and electrically connected to and rotate with the conductive roller, a stationary member being adapted to be connected to a stationary portion of the rotogravure printing press, said stationary member and rotating member having adjacent surfaces, brush means for transferring an electrical charge between said members, said brush means being mounted on the adjacent surface of one of said members and riding against the adjacent surface of the other of said members, said brush means being adapted to be in electrical communication with the power pack and the conductive roller, said brush means being isolated from said explosive vapors, seal means cooperating with said rotating and stationary members to isolate said brush means form the explosive vapors in the rotogravure press environment, said seal means locating said members relative one another, whereby said brush means are not exposed to explosive vapors and contaminants in the environment, the likelihood of a spark occurring due to misalignment of said brush means is reduced, and long brush means service life is assured.

22. An electrostatic assist rotogravure printing safety contact as in claim 22, wherein said seal means comprises a pair of bearings, and said other of said members carries a slip ring for cooperating with said brush means.

23. An electrostatic assist rotogravure printing safety contact as in claim 22, wherein said pair of bearings are ball bearings having seals thereon, one ball bearing being disposed on each side of said brush means, said ball bearings being mounted on one of said members and relatively rotatably mounting the other of said members.

24. An electrostatic assist rotogravure printing safety contact as in claim 21, wherein one of said members has a sealable, removable cap portion, said brush means being located adjacent said sealable, removable cap portion, whereby said brush means may be serviced merely by removing said sealable, removable cap portion.

25. An electrostatic assist printing safety contact as in claim 24, wherein said sealable, removable cap portion attached to is said stationary member, said removable cap portion being sealably, removably secured on the outer surface of said stationary member, and said brush means being secured to said stationary member beneath said sealable, removable cap portion.

26. An electrostatic assist rotogravure printing safety contact as in claim 21, further comprising pressurized purge means for purging said brush means with compressed air to keep the explosive vapors from said brush means, said pressurized purge means being located on said stationary member.

27. An electrostatic assist rotogravure printing safety contact as in claim 26, wherein said pressurized purge means further comprises a compressed air inlet on said stationary member and a compressed air outlet on said stationary member, said brush means being located between said compressed air inlet and outlet and in communication with said brush means.

28. An electrostatic assist rotogravure printing safety contact for conducting a high voltage charge from a power pack to a conductive roller rotating in a rotogravure printing press which can have explosive vapors and contaminants about it, the conductive roller having a shaft for mounting the conductive roller on the rotogravure press, comprising a rotating ring member adapted to be physically and electrically connected to and rotate with the conductive roller, a stationary ring member being adapted to be connected to a stationary portion of the rotogravure printing press, each of said ring members having openings therein adapted to receive the shaft, said stationary member and rotating member having adjacent surfaces, brush means for transferring an electrical charge between said members, said brush means being mounted on the adjacent surface of one of said members and riding against the adjacent surface of the other of said members, said brush means being isolated from the explosive vapors, said brush means being adapted to be in electrically communication with the power pack and the conductive roller.

29. An electrostatic assist rotogravure printing safety contact as in claim 28, further comprising an insulating sleeve adapted to be placed about the shaft to electrically isolate the shaft from the press.

30. An electrostatic assist rotogravure printing safety contact as in claim 28, further comprising two bearings for relatively rotatably mounting the rotating and stationary ring members.

31. An electrostatic assist rotogravure printing safety contact as in claim 30, wherein each of said bearings is self lubricated and has seals to keep the explosive vapors and contaminants from said brush means, to insure lubrication of said bearings, and to keep the lubrication from said brush means.

32. An electrostatic assist rotogravure printing safety contact as in claim 28, wherein said stationary member has a sealable, removable cap portion, said brush means being located beneath said sealable, removable cap portion, whereby said brush means may be serviced merely by removing said sealable, removable cap portion.

33. An electrostatic assist rotogravure printing safety contact as in claim 28, further comprising compressed air purge means for purging said brush means to keep the explosive vapors from said brush means, said compressed air purge means being located on said stationary member.

34. An electrostatic assist rotogravure printing safety contact for conducting a high voltage charge from a power pack to a conductive roller rotating in a rotogravure printing press which can have explosive vapors and contaminants about it, comprising a rotating member being adapted to be physically and electrically connected to and rotate with the conductive roller, a stationary member being adapted to be connected to a stationary portion of the rotogravure printing press, said stationary member and rotating member having adjacent surfaces, brush means for transferring an electrical charge between said members, said brush means being mounted on the adjacent surface of one of said members and riding adjacent surface of the other of said members, said brush means being isolated from the explosive vapors, and a corona shield cable for providing electrical communication between the power pack and the brush means, whereby the likelihood of a spark occurring due to the corona effect is reduced.

35. An electrostatic assist rotogravure printing safety contact as in claim 1, further comprising a bearing on one side of said brushes and a seal on the other side of said brushes, said bearing rotatably mounting one of said members on the other member, and said seal sealing between said members.

* * * * *